(12) United States Patent
Klepsvik et al.

(10) Patent No.: US 9,879,990 B2
(45) Date of Patent: Jan. 30, 2018

(54) POSITION REFERENCE SYSTEM AND METHOD FOR POSITIONING AND TRACKING ONE OR MORE OBJECTS

(71) Applicant: Kongsberg Seatex AS, Trondheim (NO)

(72) Inventors: John O. Klepsvik, Flataasen (NO); Harald Fossum Rosshaug, Oppdal (NO); Gard Flemming Ueland, Trondheim (NO)

(73) Assignee: Kongsberg Seatex AS, Trondheim (NO)

( * ) Notice: Subject to any disclaimer, the term of this patent is extended or adjusted under 35 U.S.C. 154(b) by 324 days.

(21) Appl. No.: 14/773,557

(22) PCT Filed: Mar. 18, 2014

(86) PCT No.: PCT/NO2014/050037
§ 371 (c)(1),
(2) Date: Sep. 8, 2015

(87) PCT Pub. No.: WO2014/148915
PCT Pub. Date: Sep. 25, 2014

(65) Prior Publication Data
US 2016/0025489 A1    Jan. 28, 2016

(30) Foreign Application Priority Data
Mar. 22, 2013    (NO) .................................. 20130419

(51) Int. Cl.
*G01C 3/08*    (2006.01)
*G01S 7/481*    (2006.01)
(Continued)

(52) U.S. Cl.
CPC .............. *G01C 3/08* (2013.01); *G01S 7/4817* (2013.01); *G01S 7/4865* (2013.01); *G01S 7/497* (2013.01);
(Continued)

(58) Field of Classification Search
CPC ....... G01C 3/08; G01S 7/4817; G01S 7/4865; G01S 7/497; G01S 7/4972; G01S 17/023; G01S 17/42; G01S 17/66
See application file for complete search history.

(56) References Cited

U.S. PATENT DOCUMENTS 4,209,253 A    6/1980  Hughes
4,218,138 A *  8/1980  Robertsson ............. F41G 3/265
                                               235/412

(Continued)

FOREIGN PATENT DOCUMENTS

DE    10111826 A1    10/2001
EP    1956391 A2     8/2008
WO    2011144454 A1  11/2011

OTHER PUBLICATIONS

International Search Report and Written Opinion dated Jun. 27, 2014 (PCT/NO2014/050037).

*Primary Examiner* — Eric Bolda
(74) *Attorney, Agent, or Firm* — Alix, Yale & Ristas, LLP

(57) ABSTRACT

Position reference system and method for positioning and tracking one or more objects which in addition to range and azimuth also provides the elevation angle of the target relative to the instrument axes of the sensor platform. The system and method is based on a near IR laser radar transceiver and one or more active or passive retroreflectors placed on the objects to be positioned. The present invention further includes an internal beam stabilization mechanism protected from the environment and utilize a cylindrical (Continued)

window which is transparent for the near IR laser radiation, but absorbs all visible and UV radiation and thus protects the optical parts from ambient solar radiation. In addition, the cylindrical window protects all internal mechanical parts, notably the rotating and moving parts, from a corrosive and freezing/icing environment.

19 Claims, 3 Drawing Sheets

(51) Int. Cl.
<table>
<tr><td>G01S 7/486</td><td>(2006.01)</td></tr>
<tr><td>G01S 17/02</td><td>(2006.01)</td></tr>
<tr><td>G01S 17/42</td><td>(2006.01)</td></tr>
<tr><td>G01S 17/66</td><td>(2006.01)</td></tr>
<tr><td>G01S 7/497</td><td>(2006.01)</td></tr>
<tr><td>G01S 17/74</td><td>(2006.01)</td></tr>
</table>

(52) U.S. Cl.
CPC .......... G01S 7/4972 (2013.01); G01S 17/023 (2013.01); G01S 17/42 (2013.01); G01S 17/66 (2013.01); G01S 17/74 (2013.01)

(56) References Cited

U.S. PATENT DOCUMENTS

<table>
<tr><td>2003/0090646 A1</td><td>5/2003</td><td>Riegl et al.</td></tr>
<tr><td>2005/0099617 A1*</td><td>5/2005</td><td>Ohtomo .............. G01C 15/004<br>356/141.3</td></tr>
<tr><td>2008/0074638 A1</td><td>3/2008</td><td>Sakimura et al.</td></tr>
<tr><td>2008/0259311 A1</td><td>10/2008</td><td>Nara</td></tr>
<tr><td>2009/0106989 A1</td><td>4/2009</td><td>Kamizono et al.</td></tr>
<tr><td>2011/0128162 A1</td><td>6/2011</td><td>Klepsvik</td></tr>
</table>

* cited by examiner

POSITION REFERENCE SYSTEM AND METHOD FOR POSITIONING AND TRACKING ONE OR MORE OBJECTS

BACKGROUND

Disclosed herein is a method for positioning and tracking one or more objects, as well as a laser radar position reference system for tracking and positioning one or more objects.

Dynamic Positioning (DP) systems have been used for the control of large industrial vessels for many years, predominantly in the oil and gas industry where operations require vessels to keep station against fixed or moving installations, or 'track and follow' each other in functions such as pipe or cable laying. Other maritime operations which may take advantage of the DP developments include automated docking and maneuvering in critical areas as well as "electronic anchoring" in environmentally sensitive areas (corals, etc.).

Such operations require accurate and reliable local position reference measurements to be supplied to the DP system. Depending on the criticality of the operation, three or more independent position reference systems may be required.

The growth and development of DP systems has stimulated the development of DP position measurement sensors which have become more sophisticated as technology has allowed. The DP market is familiar with the use of laser range and bearing sensors, for example, the Fanbeam* and CyScan laser systems as well as the microwave systems; Radius* and RadaScan.

All DP position reference sensors commercially available utilize an interrogator/transceiver unit on board the vessel and one or more cooperative targets (transponders, retroreflectors) localized in reference positions on nearby structures (platforms, etc.). The cooperative targets may be active (transponders), which allows for target identification, or passive (corner reflectors) which are normally used in optical systems.

EP 1956391 BI describes a laser radar apparatus for measuring both the direction and the distance to an object using a laser beam. The laser beam can be rotated in a single plane through 360 DEG by the rotation of a mirror assembly which reflects the laser beam towards the object.

From U.S. Pat. No. 4,209,253 it is known a high precision laser radar tracking system. Targets which can be tracked include diffuse passive targets, specular passive targets and optical transponders. The base section of the system is fixed relative to the upper section which can rotate through 360 DEG. The lower section has a laser beam generator, optical signal detector system with a beam splitter/reflector and the upper section has three moveable reflectors one of which acts as a trackable transmitter/receiver aperture.

From NO 332432 it is known a system for detection and depiction of objects in the course of speed boats and other marine vessels and for warning about objects that may constitute a risk to the navigational safety.

However, except for NO 332432, none of the prior art reference systems are true 3D positioning sensors. The prior art systems provide range and azimuth information of a target relative to the vessel, but take no account of any elevation difference between the interrogator/transceiver unit and the target. For significant elevation differences, the resulting horizontal positioning error may be considerable.

Accordingly, prior art is not able to provide absolute positioning of targets.

In order to compensate for roll- and pitch movement of the sensor platform, the prior art position reference systems utilize an external gimbal-based stabilized platform which is subject to a corrosive and freezing/icing environment.

Another disadvantage of prior art solutions is that the optical transceiver is rotated around a vertical axis in order to provide horizontal coverage. Both these mechanisms are subject to a corrosive and freezing/icing environment and which may result in frequent maintenance.

SUMMARY

The present disclosure provides a position reference system and method for positioning and tracking one or more objects which solves the above-mentioned problems with prior art.

Also provided is a true 3D positioning system which in addition to range and azimuth also provides the elevation angle of the target relative to the instrument axes of a sensor platform.

Also provided is a position reference system and method for positioning and tracking one or more objects which are arranged for transmitting laser light pulses in a desired direction by controlling a laser source and an optical collimator for generating a fan-shaped laser beam with predefined vertical and horizontal beam widths and a mirror for emitting the laser beam in the vertical plane.

Also provided is a position reference system and method for positioning and tracking one or more objects which are arranged for detection of reflected/returned light from cooperative targets located at objects to be positioned by means of a mirror, an optical receiver lens and a photodiode array.

Further provided is a position reference system and method for positioning and tracking one or more objects which are arranged for absolute positioning of the tracked object by observing and calculating range, elevation and azimuth to one or more objects relative to the axes of the position reference system.

Also provided is a position reference system and a method for positioning and tracking one or more objects which takes into consideration the movements of a sensor platform the system is arranged on by controlling a mirror for stabilizing the fan-shaped laser beam and the overlapping vertical Instantaneous Field of View (IFOV) of the receiver relative to the horizontal plane.

Also provided is a laser radar positioning and tracking sensor where all optically sensitive components are protected from ambient solar radiation in the visible and UV part of the spectrum and where all moving and/or rotating parts are protected from the corrosive and freezing/icing environment.

A true 3D positioning system, which in addition to range and azimuth, provides elevation angle of a target relative to the instrument axes of a sensor platform.

A position reference system includes an internal beam stabilization mechanism protected from the environment.

The position reference system and method for positioning and tracking one or more objects is based on a transceiver unit arranged for being fixed to a sensor platform, such as an object, vessel or similar. The position reference system and method for positioning and tracking one or more objects further includes the arrangement of cooperative targets, either active or passive on the object(s)/target(s) to be positioned. The disclosed embodiments are especially suitable for local, short range and accurate positioning of offshore objects/targets for DP operation of supply vessels and FPSO facilities, i.e. for ranges up to a few km.

The disclosed transceiver unit includes a cylindrical housing wherein all mechanical, electrical and optical components are enclosed and sealed from the environment. The housing is at its upper part provided with a cylindrical window aligned with the housing. The window is further preferably an IR-transparent window, i.e. it does not transmit light in the visible and UV part of the spectrum. This can be achieved by means of a wave length selective coating or film, or that the window material itself absorbs visible and UV radiation.

The disclosed window thus works as an optical filter for the transceiver unit and will prevent heating of components of the transceiver unit due to e.g. sunlight, and prevent scattered ambient light in the transceiver unit, e.g. from the sun or other light sources, which could result in excessive noise in the range measurements.

The window is further preferably provided with an outer hydrophobic coating which will prevent accumulation of water droplets and ease cleaning of the window.

Furthermore, the cylindrical window provides a 360 degrees field of view in the horizontal plane.

The transceiver unit is further provided with a laser source for emitting a fan-shaped pulsed laser beam for illuminating a defined area and provided with receiving means arranged for detecting a reflected or returned signal from the illuminated area by cooperative targets (transponders, corner cubes or retroreflective tape) arranged at objects to be positioned.

The laser source preferably includes a laser diode and an optical collimator generating an illumination beam with a predefined vertical and horizontal beam width.

The transceiver unit is further provided with a controllable mirror to achieve the required Vertical Field of Regard (VFOR), which mirror is controllable about a horizontal axis.

The transceiver unit is further provided with a two axis inclinometer which together with the controllable mirror enables stabilization of the fan-shaped beam and the Instantaneous Field-of-View (IFOV) of the receiver relative to the horizontal plane. For more accurate positioning in a dynamic situation onboard vessels at sea, additional angular attitude data (roll, pitch, heading) may be input to the transceiver from an external motion reference sensor (MRU, VRU or similar). It is important to compensate for the angular movements of the sensor platform to prevent gaps (loss of coverage) in the field of regard due to the movements, and to be able to measure elevation of objects relative to the horizon which will be described in more detail below.

For detecting a reflected/returned signal from an active or passive retroreflector the transceiver unit is provided with a linear photodiode array for sensing the reflected or returned laser beam. An optical receiver lens is arranged for focusing the received/returned signal via the mirror onto the photodiode array.

The use of a linear array of photodetectors enable the determination of the elevation angle $\Theta$ of the reflected/returned signal relative to the transceiver axes since each array element (or pixel) maps into a specific elevation angle, as illustrated in FIG. 1. The accuracy of the angle measurements can be improved by a slight defocussing of the reflected/returned signal such that the defocused image covers more than one array element. This enables interpolation of elevation angles between the fixed angles given by the array elements. Thus, the actual elevation angle $\Theta$ is the sum of the angle estimated a using the linear photodiode array and the offset angle (tilt) given by the mirror.

By utilizing the mirror angle and interpolation of the illuminated photodiodes, the elevation angle between the transceiver unit and the target (reflector) can be calculated with high accuracy. Reference is also made to FIG. 2 which shows a principle drawing of positioning when one does not compensate for elevation. Prior art solutions are not able to measure the elevation angle $\Theta$ from the transceiver unit to a target (reflector) and will thus need to estimate the position $X_{est}im_{ate}$ from the measured range to the target (reflector), which may result in a considerable error $\Delta X$.

By measuring the elevation angle $\Theta$ one is able to calculate position X with high (absolute) accuracy. Accordingly, as the elevation angle continuously will change for objects moving, especially if the transceiver is located with considerable height difference from the reflector, it will at all times be necessary to know the elevation angle $\Theta$ to be able to calculate the horizontal position of the object with high accuracy.

Another advantage with the photodiode array is that one by utilizing the vertical discrimination capability is able to distinguish more easily between reflected light from target reflectors and other sources of IR radiation, such as from the sun. It is also much easier to discriminate other spurious reflective objects, i.e. reflective clothing, etc. not intended for positioning and tracking purposes.

Objects, vessels or similar to be positioned or tracked via the disclosed embodiments, as mentioned above, are provided with passive or active retroreflectors which are arranged to reflect/return a small part of the emitted illumination beam from the laser source. A passive retroreflector will for optical systems typically be a corner cube reflector (hollow or prism) or a cluster of corner cubes arranged to cover a large sector. By using an active retroreflector (transponder) one may modify some optical or signal characteristics of transmitted signal before it is returned/reflected to the transceiver unit. As mentioned above, this enables automated target identification. The use of passive retroreflectors may cause "target swopping" well known from conventional radar tracking systems, however, given the positioning accuracy and discrimination capability of optical systems, this is not likely to occur for the present invention.

When corrected for the attitude angles of the sensor platform, the instrument coordinate frame can be aligned with the appropriate geographic coordinate frame, and when the geographic position of the transceiver unit is known (from GPS or similar) the geographic position of the reflectors can also be determined. The disclosed system is able to observe range, elevation and azimuth to one or more retroreflectors relative to the instrument axes of the transceiver unit.

The disclosed system is arranged to track more than one retroreflector simultaneously.

The system is further preferably provided with at least one control unit arranged for controlling the components of the transceiver unit and arranged for processing all data and measurements internally, but can also be arranged for communication with external units for processing data and measurements.

The disclosed position reference system and method has two main modes of operation;

1. Search and identification Mode; where the transceiver unit scans the total field of regard (FOR), 360° in azimuth and preferably min. 60° in elevation, in order to detect, identify (automatic or manually) and position all objects within FOR equipped with an active or passive retroreflector. This mode may also include performing a scan without having the laser source activated to map/detect possible noise sources/bright spots which could affect the accuracy.

2. Search and Tracking mode; where all identified objects are tracked, and their positions updated at a rate of preferably min. 1 per sec.

The system is further arranged for communication with external sensor means for receiving motion data/information of the sensor platform, such as roll, pitch, yaw, surge, sway and/or heave, the transceiver unit is arranged on, which information will be used by the transceiver unit to stabilize the fan-shaped beam and the vertical IFOV of the receiver in the horizontal plane by controlling the mirror, as described above, and to compensate for the motion data when calculating the absolute position of a retroreflector.

The disclosed system can further be provided with external retroreflector(s) mounted in fixed position(s) on the sensor platform for self-calibration. By arranging external retroreflector(s) with known fixed position(s) on the same sensor platform as the transceiver unit is arranged one will have a calibration reference at all times.

The system can further be arranged for calculating velocity of objects or vessels, especially in relation to automatic docking operations. The velocity of a tracked object can be calculated by utilizing the calculated position information.

The system can further be connected to a GPS/GNSS system of the sensor platform, such as an object, vessel or similar, it is arranged on for displaying positioned and tracked objects in a map by connecting data from the position reference system with GPS/GNSS data/information. The system also includes a graphical user interface (GUI) from which the system settings and operational parameters can be set.

A method for positioning and tracking one or more objects provided with active or passive retroreflectors may be summarized in the following steps:

a. emitting a fan-shaped pulsed laser beam with predefined vertical and horizontal beam widths by controlling a mirror for emitting the laser beam in the vertical plane and stabilizing the fan-shaped beam relative to the horizontal plane as well as the overlapping Instantaneous Field-of-View of the receiver relative to the horizontal plane, b. detecting the reflected/returned light from retroreflectors located at object(s) to be positioned and tracked by means of the controllable mirror and an optical receiver lens focusing the reflected/returned light onto a photodiode array, c. calculating the elevation angle to the object(s) by measuring the mirror angle and interpolation of the illuminated photodiodes in the photodiode array, measuring the azimuth angle and measuring time of flight for the laser light pulses from transmission to reception, d. calculating range and bearing to the object(s) relative to the instrument-axes of the sensor platform based on information from step c).

Step a) includes controlling the mirror based on information from a two axis inclinometer for compensating for angular movements of the sensor platform and/or information about sensor platform movements from a Motion Reference sensor (MRU, VRU or similar).

Step b) can further include vertical discrimination of the photodiode array to distinguish between reflected/returned light from retroreflectors and other sources, such as from the sun or other light sources, with the purpose of eliminating error sources.

Step d) includes calculating bearing by means of the azimuth position at the transmission time of outgoing laser pulse. Azimuth is measured by means of an accurate absolute angular encoder connected to the rotation axis of the transceiver at the time of transmission of the light pulse. The system can detect several partially overlapping subsequent pulses and interpolate in order to improve the azimuth accuracy.

The method can further include a step for determining the geographic position of the tracked object.

The method further includes a step of storing the calculated and measured data/parameters in a database together with time of measurement. The method can further includes using active reflectors (transponders) arranged for modifying optical or signal characteristics of the transmitted signal before it is returned/reflected to the transceiver unit.

The method can further include a step for compensating for different atmospheric attenuation which occurs due to various weather conditions. This can be compensated for by means of controlling the gain of the detector amplifier as a function of time (Time varied gain, TVG).

BRIEF DESCRIPTION OF THE DRAWINGS

The invention will below be described in detail with reference to the attached drawings, where.

DETAILED DESCRIPTION

Figure 3:
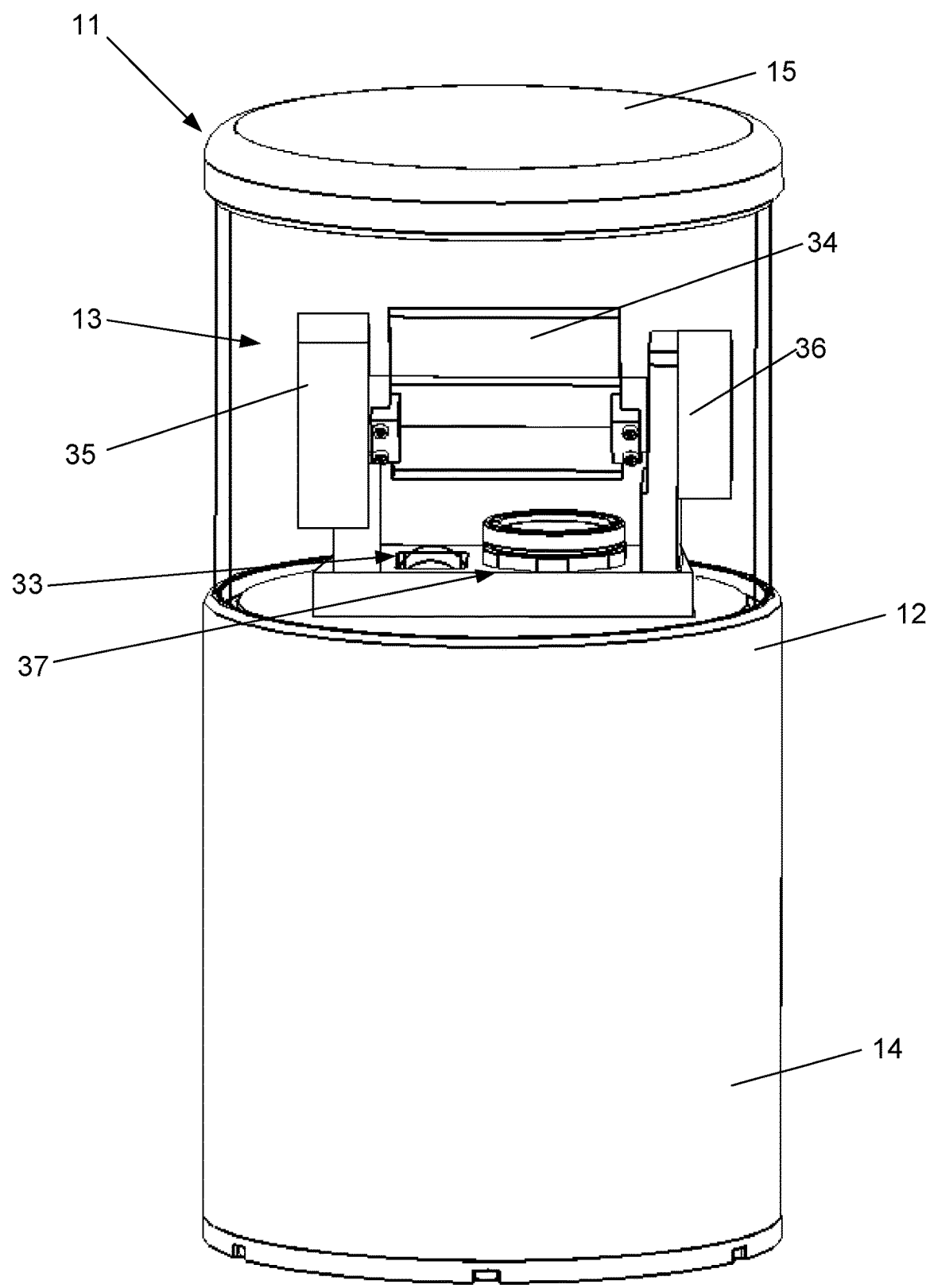
FIG. 3 is a perspective view of a transceiver unit for a system according to the disclosure.

Reference is now made to FIG. 3 which shows a perspective drawing of a transceiver unit 11. The transceiver unit 11 includes an encapsulating housing 12 which at its upper part is provided with a transparent window 13 for transmitting a laser beam out of the housing 12 and receiving reflected/returned light from active or passive retroreflectors. The window 13 is preferably an IR-transparent window which also filters out ambient visible and UV radiation and has a cylindrical shape and is aligned with the housing 12.

The housing 12, which also preferably has a cylindrical shape, is at its lower end provided with a base plate 14 arranged for fastening of the transceiver unit 11 to a sensor platform, such as an object, vessel or similar and is at its upper end provided with a lid 15. The housing 12 will accordingly provide a watertight and protective environment for all components of the transceiver unit 11.

Figure 4:
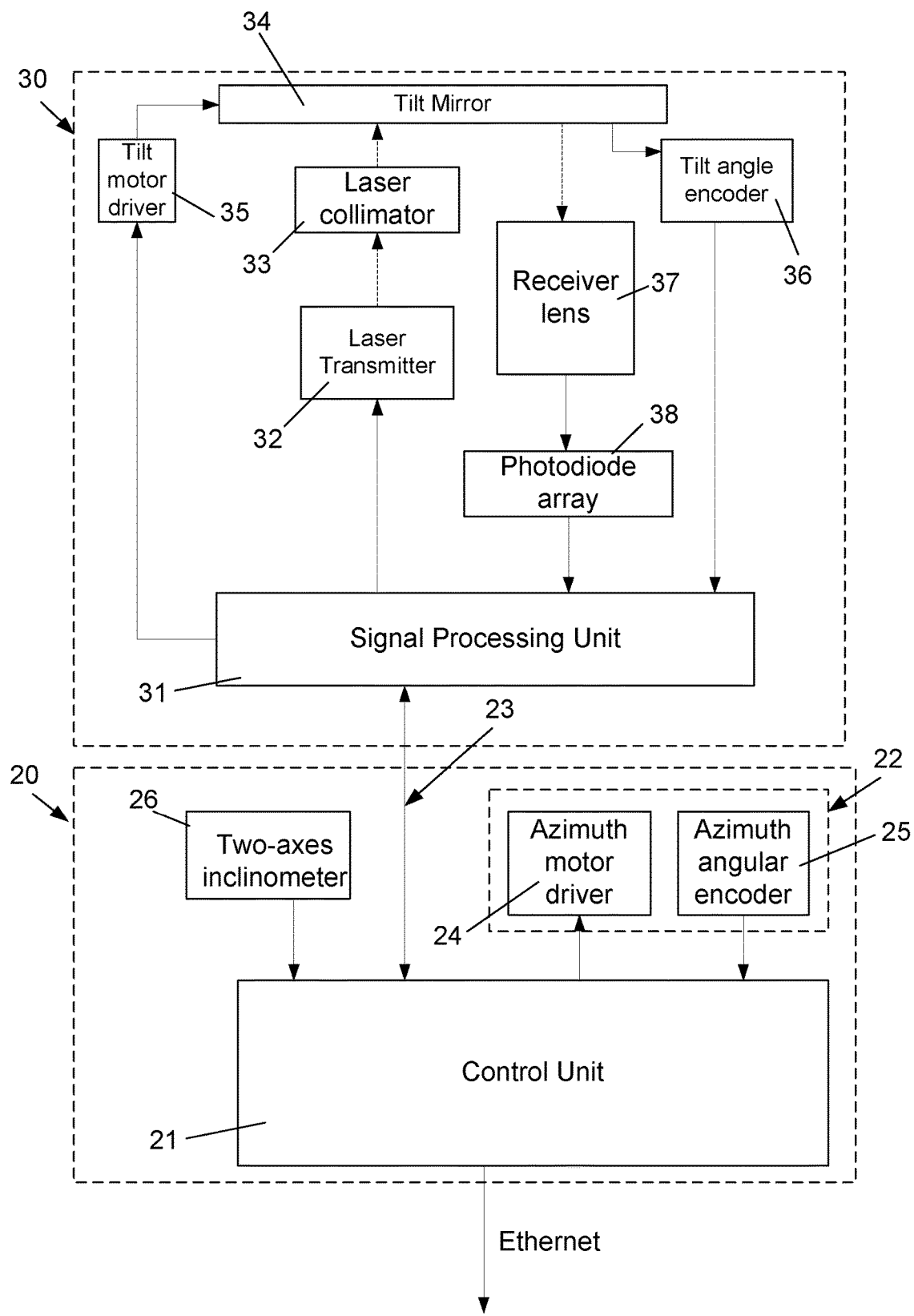
FIG. 4 is a block diagram of the transceiver unit according to the disclosure.

Reference is now made to FIG. 4 which shows a block diagram of the transceiver unit 11 which shows the main components of the transceiver unit 11. The transceiver unit 11 includes a stationary part 20 and a rotating part 30. The main components in the stationary part 20 include a control unit 21 in the form of one or more circuit boards, driving means 22 for the rotating part 30, and mechanical and electrical connection means 23 between the stationary part 20 and rotating part 30. The driving means 22 includes an electrical motor 24 and reader means 25, such as an accurate absolute angular encoder, for monitoring the azimuth position of the electrical motor 24 and rotating part 30. The driving means 22 can further e.g. include one or more toothed pulleys (not shown) and toothed belt(s) (not shown)

for driving the rotating part 30. The driving means 22 are arranged to the rotating part 30 by means of a shaft (not shown) which is arranged to be driven by the electrical motor 24, e.g. by means the pulleys and toothed belt. The stationary part 20 also includes a two-axis inclinometer 26 which will be used for controlling a mirror 34 in the rotating part 30.

The main components of the rotating part 30 of the transceiver unit 11 include:
- a signal processing unit 31 in the form of one or more circuit boards,
- transmitter assembly including a laser source 32 and an optical collimator 33,
- mirror 34, driving means 35 for the mirror 34, reader means 36 for reading the angular position of the mirror 34,
- a linear photodiode array 38, and
- an optical receiver lens 37 for focusing received/reflected light onto the linear photodiode array 38.

The photodiode array 38 includes a series of photodiodes arranged in a line, such as a 16-element linear photodiode array, e.g. an avalanche photodiode array.

The transceiver unit 11 is further provided with suitable means for processing of analogue signals from the photodiode array 38, such as variable gain amplifiers and analogue-to-digital converters for converting the analogue sensor signals to digital signals for further processing by digital processing means.

The laser source 32 and optical collimator 33 are arranged to generate a laser beam with a predefined vertical beam width, preferably>10°, and a predefined horizontal beam width, preferably less than 2 mrad.

The controllable mirror 34 is arranged to achieve a preferred Vertical Field of Regard of −10° to +60°, which mirror 34 is arranged to be controllable about its horizontal axis.

It should be noted that the mirror 34 shown in FIG. 3 has a rectangular shape, but this is only an example and the mirror 34 can also be elliptical in order to reduce weight.

The transceiver unit 11 further preferably includes light shields arranged between sensitive components, e.g. for ensuring that no other light than that received by the optical receiver lens 37 is detected by the photodiode array 38. The signal processing unit 31 of the rotating part 30 is provided with means and/or software arranged for being a data input sampler and is preferably arranged so that it has no information about searching, tracking or positioning, which will be handled by the control unit 21 of the stationary part 20.

The signal processing unit 31 is provided with means and/or software for one or more of:
- controlling the photodiode array 38, variable gain amplifiers and analogue to digital converters,
- pulse detection and time-of-flight measurements,
- main clock and timing system,
- controlling the mirror 34,
- controlling the laser source 32.

Figure 1:
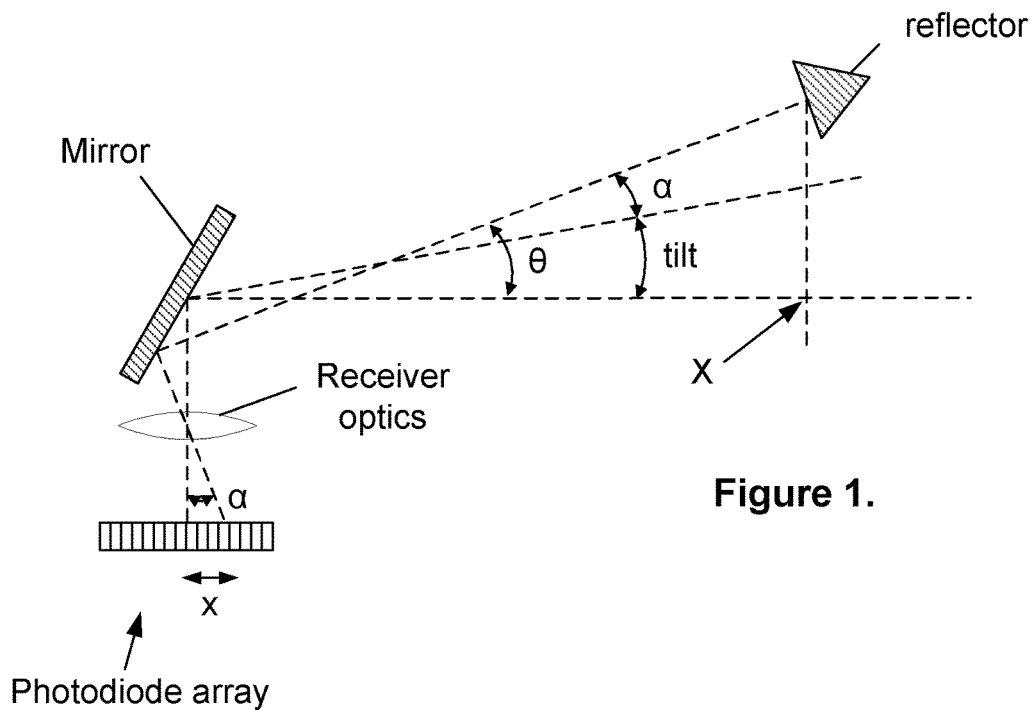
FIG. 1 illustrates the principle of determination of elevation according to the disclosure.
Figure 2:
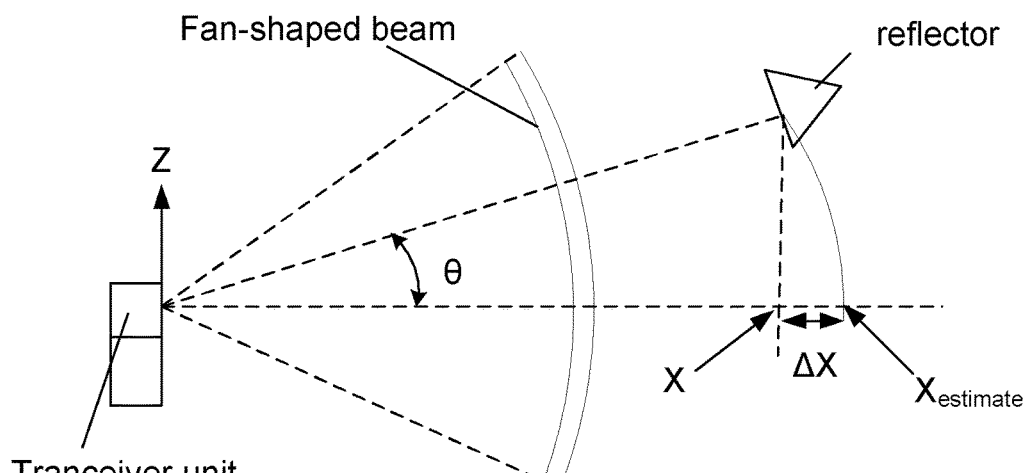
FIG. 2 illustrates the error one will get in positioning of an object if one does not compensate for elevation.
Figure 5:
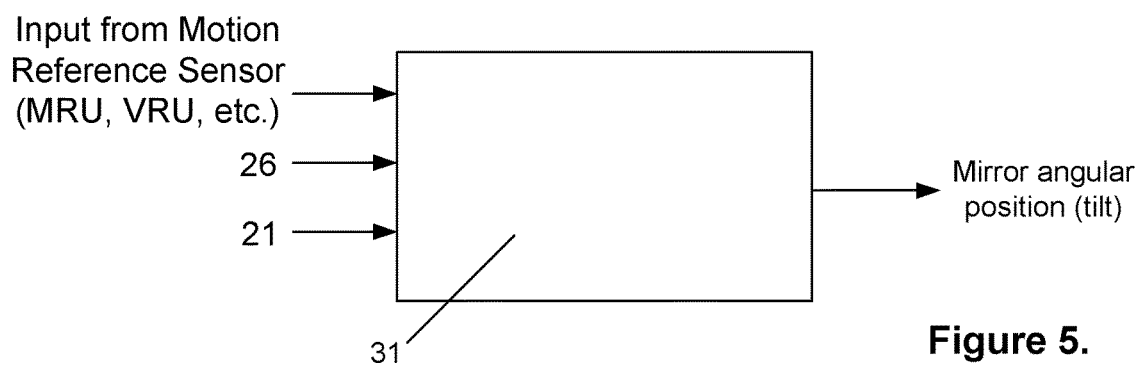
FIG. 5 shows how the mirror control according to the disclosure is performed.

Reference is now made to FIG. 5 which shows how the mirror 34 is controlled by means of the signal processing unit 31. Based on input from sensors monitoring the movements of the sensor platform, such as an object, vessel or similar, and the two axis inclinometer 26, and input from the control unit 21, such as range, azimuth and tilt angles, the position of the mirror 34 is calculated and settings provided to the electrical mirror motor 35 which performs the positioning of the mirror 34. Accordingly, the two axis inclinometer 26 will together with the electrical mirror motor 35 ensure stabilization of the fan-shaped beam and the IFOV of the receiver relative to the horizontal plane as well as overlapping Instantaneous Field-of-View of the receiver relative to the horizontal plane.

The mirror position is preferably continuously controlled to compensate for the movement of the sensor platform as well as settings related to tracking and positioning of retroreflectors at different elevation angles.

Controlling the laser source 32 and photodiode array 38 includes controlling the output power of the laser source 32 and the gain of the (avalanche) photodiode array 38.

VGA gain control includes controlling gain slope of the VGA gain control to compensate for different atmospheric attenuation, i.e. weather conditions.

Controlling pulse detection includes setting noise threshold levels.

The control unit 21 of the stationary part 20 is provided with means and/or software for one or more of:
- controlling the search for new targets/objects and tracking process for identified targets/objects,
- performing integrity check, generate telegrams and communicate with GUI (Graphical user interface) and external motion reference sensors,
- performing calculation of elevation angle, —performing calculation of range and bearing,
- controlling drive means 22 for driving the rotating part 30 of the transceiver unit 11,
- interface control,
- communication with external units via an Ethernet interface or similar.

Timing control is essential in a system like this and this can be implemented by means of P F (pulse repetition frequency) clock which is generated by the reader means 25 in the stationary part 20 of the transceiver unit 11, such that the laser pulse is fired at fixed angular intervals.

The signal processing unit 31 is arranged for firing a laser pulse with the laser source 32 for each PRF-edge and after that searches for reflected/returned signals on a predefined number of channels on the photodiode array 38, such as 4/8/16 photodiode channels.

The signals from the photodiode array 38 are then amplified and compressed dynamically in e.g. TVG-amplifiers (Time-Varied-Gain) prior to A/D-conversion.

The signal processing unit 31 of the rotating part 30 receives the PRF-clock signal from the control unit 21 of the stationary part 20 together with azimuth 0° information. For every positive edge on the PRF-clock the laser source 32 emits a pulse. So, for every laser pulse, the control unit 31 has knowledge of the azimuth position.

The light signals from possible retroreflectors, such as a corner cubes (passive) or an active transponder, are detected in the photodiode array, and the digitized photodiode data is sent to the control unit 21 for further processing. Examples of such data are photodiode number, time samples, azimuth angle, mirror position, etc. The Pulse Peak Detection and range measurement are made digitally utilizing a fast FPGA-processor in the control unit 21. After the control unit 21 receives signal data and the other mentioned data the control unit 21 performs integrity check of the data. The integrity checks could be based on one or more of: pulse integral, checking for pulse detection on "neighbor pulses", checking for pulse detection on "neighbor receiving elements", etc.

If the integrity check is passed, range, bearing and elevation can be calculated.

Range estimation is based on accurate time-of-flight (TOF) measurements for the transmitted and received pulses. TOF measurements are based on a digital equivalent of the Constant Fraction of Pulse Height discriminator (CFD) which is independent of pulse height for the return pulses and is known to provide the most accurate TOF-estimates.

Bearing can be calculated by means of the azimuth angular sensor 25 and the known mounting angle of the transceiver unit relative to the sensor platform heading.

When corrected for attitude angles of the sensor platform, i.e. object, vessel or similar, the geographic position of the reflector and/or transceiver unit can be determined. The disclosed embodiments allow tracking of several retroreflectors at the same time, at least ten retroreflectors simultaneously.

The system can further be provided with means for self-calibration by arranging one or more retroreflectors on the same sensor platform being outside the housing 12 and use this/these as a calibration reference for self-calibration.

The system also allows positioning of the transceiver unit instead of the reflectors, by that the reflectors have a fixed and known position.

The linear photodiode array used for detection of the reflected laser pulses can also be a 2D photodiode array.

The laser source is preferably arranged for operating in the near I band (905 nm). At this wavelength there are a number of low cost pulsed laser diodes available off-the-shelf, as well as reasonably priced Si APD detectors, both single detectors and arrays with very good responsivity for near IR.

It is well known, however, that moving to larger wavelengths, i.e. short wave IR and mid IR, from 1.4 to 3 micrometer, will reduce atmospheric attenuation and thereby allow larger measurement ranges. Equally important is that these wavelengths offer much higher level of eye-safety. Compared to 905 nm, a 1.5 micrometer laser may be used to power levels almost six orders of magnitude higher (Ref.: IEC 60825-1, Ed.2, 2007-03). However, the detector technology for these wavelengths (InGaAs, etc.) is much less commercially mature, and APD arrays are not available off-the-shelf. Thus, the laser power levels will have to be increased by two orders of magnitude in order to compensate for the reduced responsivity of the detectors.

The system can further be arranged for transmitting a coded lightpulse. A coded pulse in combination with a replica correlator in the receiver can be employed to provide enhanced range accuracy.

The invention claimed is:

1. A method for positioning and tracking one or more objects using a transceiver unit fixed to a sensor platform and one or more active or passive retroreflector arranged at each of said one or more objects to be positioned, comprising:
    (a) emitting a fan-shaped pulsed laser beam with predefined vertical and horizontal beam widths by controlling a mirror (34) for emitting the laser beam in a plane in the vertical direction and stabilizing the fan-shaped beam relative to a plane in the horizontal direction and overlapping Instantaneous Field-of-View of a receiver relative to the horizontal plane,
    (b) detecting reflected or returned light from said at least one retroreflector located at an object to be positioned and tracked by the controllable mirror (34) and an optical receiver lens (37) focusing the reflected or returned light onto a photodiode array (38),
    (c) calculating elevation angle to the object by measuring mirror angle and interpolation of illuminated photodiodes in the photodiode array (38), measuring azimuth angle and measuring time-of-flight for laser light pulses from transmission to reception, and
    (d) calculating range and bearing to the object relative to instrument-axes of the sensor platform based on information from step (c).

2. The method of claim 1, comprising controlling the mirror (34) based on information from a two axis inclinometer (26) for compensating for angular movements of the sensor platform or information about sensor platform movements from a Motion Reference Sensor.

3. The method of claim 1, wherein step (b) includes vertical discrimination of the photodiode array (38) to distinguish between reflected or returned light from retroreflectors and other sources.

4. The method of claim 1, wherein bearing is calculated by azimuth position at transmission time of outgoing laser pulse.

5. The method of claim 1, comprising the step of determining geographic position of the at least one object to be tracked.

6. The method of claim 1, comprising the step of storing data or parameters calculated and measured in a database together with time of measurement.

7. The method of claim 1, comprising the step of using active reflectors arranged for modifying optical or signal characteristics of a transmitted laser beam signal before the transmitted laser beam signal is returned or reflected from the retroreflectors to the transceiver unit.

8. The method of claim 1, comprising the step of compensating for different atmospheric attenuation via controlling gain of a detector amplifier as a function of time.

9. A system for positioning and tracking one or more objects provided with active or passive retroreflectors, comprising a transceiver unit (11) having a housing (12) with a window (13) through which light can be transmitted and received, a stationary part (20) and rotating part (30) in one unit enclosed and sealed within the housing (12), the rotating part (30) including a transmitter assembly with a laser source (32) and optical collimator (33), a receiver assembly including an optical receiver lens assembly (37), and a mirror (34) for transmitting and receiving reflected or returned light from a retroreflector, wherein
    the laser source (32) and optical collimator (33) are arranged to generate a pulsed fan-shaped laser beam with predefined vertical and horizontal beam widths,
    the mirror (34) is controllable and arranged for emitting the laser beam in a plane of the vertical direction and stabilizing the fan-shaped beam and an overlapping Instantaneous Field-of-View of the receiver relative to a plane in the horizontal direction,
    the receiver assembly includes a photodiode array (38) and that the optical receiver lens (37) is arranged to focus returned or reflected light from a retroreflector on one of the at least one objects via the mirror (34) onto the photodiode array (38), and
    a unit for calculating range, bearing and elevation to the at least one object relative to the instrument-axes of the sensor platform.

10. The system of claim 9, wherein the transceiver unit (11) is fixed to the sensor platform.

11. The system of claim 9, wherein the window (13) has cylindrical shape.

12. The system of claim 9, wherein the window (13) is an IR-transparent window.

13. The system of claim 9, wherein the transceiver unit (11) includes a two-axis inclinometer (26).

14. The system of claim 9, wherein the transceiver unit (11) includes a driver (35) for rotating the mirror (34) and a reader (36) for reading angular position of the mirror (34).

15. The system of claim 9, further comprising instrumentation for self-calibration of that at least one reflector with fixed and known position and orientation relative to the instrument-axes of the sensor platform that are arranged outside the housing (12) on the same sensor platform as the transceiver unit (11) to provide a calibration reference.

16. The system of claim 9, wherein rotation of the rotating part (30) is driven by an electrical motor (24), comprising a reader (25) for monitoring azimuth position of the rotating part (30).

17. The system claim 9, wherein the rotating part (30) includes a signal processing unit (31) configured for one or more of:
 (a) controlling the photodiode array (38), variable gain amplifiers and analogue to digital converters,
 (b) detecting pulse and time-of-flight measurements,
 (c) operating a main clock and timing system,
 (d) controlling the mirror (34), and
 (e) controlling the laser source 32.

18. The system of claim 9, wherein the stationary part (20) includes a control unit (21) configured for one or more of:
 (a) controlling a search for new targets or objects and tracking said new targets or objects,
 (b) performing an integrity check, generating telegrams and communicating with graphical user interface (GUI) and external motion reference sensors,
 (c) performing a calculation of elevation angle,
 (d) performing calculation of range and bearing,
 (e) controlling a driver (22) for driving the rotating part (30) of the transceiver unit (11),
 (f) controlling a user interface,
 (g) communicating with external units via an Ethernet or network interface.

19. The system of claim 9, being configured for exchanging data with a GNSS-system for displaying tracked and positioned objects in a map.

* * * * *